June 14, 1960

T. B. LUNDBERG 2,940,777

IRRIGATION HOSE

Filed July 16, 1956

INVENTOR.
THEODORE B. LUNDBERG
BY
*H. W. Brelsford*
ATTORNEY

United States Patent Office 2,940,777
Patented June 14, 1960

2,940,777
IRRIGATION HOSE
Theodore B. Lundberg, 139 N. F St., Lompoc, Calif.
Filed July 16, 1956, Ser. No. 598,177
4 Claims. (Cl. 285—5)

My invention relates to equipment for furrow type irrigation and has particular reference to a detachable hose of short length that may be quickly attached to an irrigation pipe to deliver water to individual furrows.

A currently popular method of delivering irrigation to the individual furrows of a field to be irrigated is to place a perforated pipe transversely on the ridges formed between the furrows. The perforations are so placed that they are aligned with the furrows formed in the ground and water flows through the perforations to fall into the furrows. Such pipes, which are generally portable, frequently have individual gate valves for each perforation to control the volume flowing from each perforation.

The use of such perforated pipes gives rise to problems of spot erosion where the falling stream of water strikes the earth. Burlap sacks have been wrapped around the pipe or anchored in the furrow in an attempt to minimize this erosion. This use of sacks is an improvision at best, and frequently erosion results, the water digging a large hole that collapses the ridges between furrows. This permits water to run from one furrow to another rather than down its own furrow, resulting in uneven irrigation. Frequently also the erosion of the ridges drops the pipe resting on them and causes disruption of water flow to the entire field.

It is known that this erosion control for furrow irrigation can be simply effected by attaching a length of flexible hose over the pipe opening to lead the water into the bottom of the ditch and discharge it in a stream that is parallel to the bottom of the furrow. The erosion control is similar to that achieved with lateral siphon tubes. Such hoses, however, have not been used due to the expense of attachment fittings and the time consumed in attaching them.

I have devised a simple snap-on type of short hose length that can be used with any perforation construction. The time consumed in the attachment is nominal. The hose attachment fitting is designed also for long life.

It is therefore a general object of my invention to provide an improved detachable hose length for lateral flow control from irrigation pipes;

Another object is to provide a simple snap-on hose and coupling combination for delivering water flow to furrows from a perforated irrigation pipe;

A further object is to provide an inexpensive lateral delivery hose for furrow type irrigation;

Other objects and advantages of my invention will be apparent in the following description and claims considered together with the accompanying drawing forming an integral part of this specification, and in which, Fig. 1 is a perspective view of a portion of a crop field showing a length of irrigation pipe with my delivery hoses secured to it.

Figure 1:
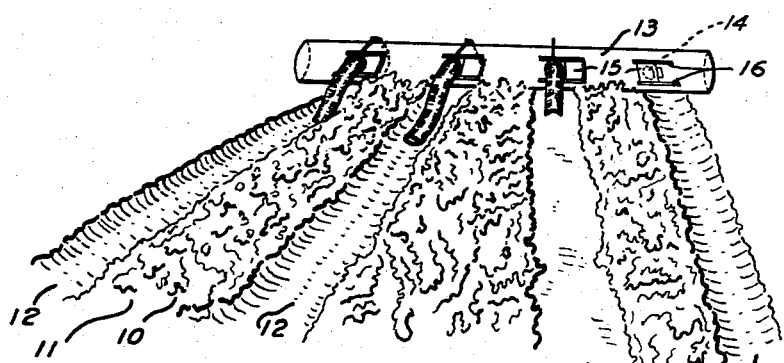

Referring to Fig. 1 there is illustrated a field of a leaf crop 10, such as spinach, growing on ridges 11 formed between furrows 12. A section 13 of irrigation pipe is disposed transversely of the ridges 11 resting on the ridges. The pipe section 13 is provided with a spaced plurality of perforations 14 through which water may flow and when not in use, a gate valve 15 may slide over the perforation to close it to prevent flow of water. The slide valves 15 may be disposed in suitable tracks 16. There is illustrated in Fig. 1 one of the furrows filled with water as during normal irrigation with several of the other furrows empty to show the complete arrangement of my irrigation hose within a furrow.

Figure 3:
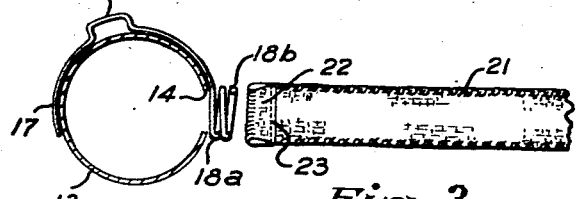
Fig. 3 is a view in full section through an irrigation pipe and through the hose portion and showing the attachment portion of my hose mounted on the pipe with the hose spaced away from its attaching member.
Figure 4:
Fig. 4 is an elevation view of the device of Figs. 2 and 3 fully assembled.

Referring to all of the figures, the embodiment of my invention illustrated may have a semicircular loop 17, a helix 18 having its axes of generation generally radial from the semicircular center as best illustrated in Fig. 3. This helix preferably has two turns on it as illustrated in Fig. 3 having, accordingly, an inner turn 18a and an outer turn 18b. The semicircle 17 may have a short portion of its length bent outwardly to form a handle portion 19.

Figure 2:
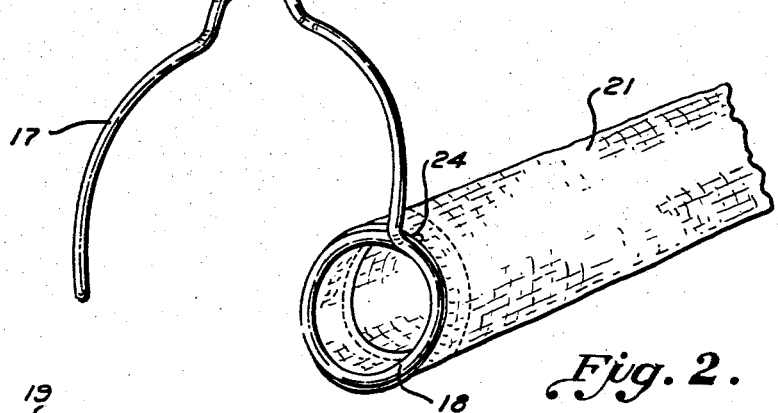
Fig. 2 is a perspective view of the embodiment of my invention illustrated in Fig. 1 with a portion of the hose broken away.

The conduit portion of my irrigation hose may be in the form of a cylinder 21 of any suitable material, the only requirement being that it is relatively tight and that it is also pliable or flexible. The illustrated conduit 21 is formed of a durable grade of canvas and may be formed into tubular shape by sewing a strip together. At one end of the hose section 21 the canvas is hemmed at 22 being secured by any suitable fastener such as stitches 23. As illustrated more particularly in Fig. 2, this hem is slit longitudinally of the hose as at 24 at which point the outer helix turn 18b is inserted in this hem and the hose 21 is rotated 360° until it occupies and covers a complete turn of the helix 18.

Preferably the helix turns 18a and 18b are formed tightly together so that the inner turn 18a presses against the canvas hem 22 to retain it tightly in position on the helix.

In operation the farmer will dispose a suitable number of connected lengths of perforated conduit 13 across the ridges 11 of a furrowed field. He will then grasp a number of these irrigation hoses and will place the helix 18 over a perforation 14 and will thereupon press downwardly the resilient semicircle 17. This will snap onto the irrigation pipe 13 as illustrated in Fig. 3, and the former will center the hose 21 over the perforation 14. Water can then flow freely from the interior of the pipe through the outer helix ring 18a and into the hose 21. Since the other end of the hose 21 lies in the bottom of the furrows 12 and is generally parallel to it, there will be little or no erosion due to current flow.

When the irrigation is finished the operator merely grasps the handle portion 19 of the semicircle 17 and pulls upwardly against the resilience of that semi-circle unsnapping the entire device. There will be no wear or abrasion from pipe contact on the hose 21 inasmuch as the inner helix ring 18a bears against the pipe 13 and receives all the abrasion. In this manner a long life is obtained from the flexible hose section 21.

It will be obvious to those skilled in the art that this type of hose section may be used on any type of irrigation pipe including those having short nipples in which case the helix 18 will merely surround the projecting nipple. The semicircle 17 may be formed of any suitable material that is resilient in nature and which is preferably non-corrosive. I prefer at present to form this semicircle and the helix 18 out of a single piece of prefabricated material and having successfully employed galvanized steel wire. Stainless steel wire or strap could also be used and furthermore, any of the protective finishes on any of the corrosive metals could be used, including heavily lacquered bare steel wire. Likewise, strap or strip material may be suitably employed.

While I have described my invention with respect to a specific embodiment thereof, I do not limit myself to this embodiment but include within the claims all modifications and variations as fall within the true spirit and scope of my invention.

I claim:

1. A furrow irrigation hose for attachment to a perforated irrigation pipe comprising: a helix having a plurality of turns held tightly together forming a first part of a hose conduit; a flexible tube including a hem at one end receiving at least one end turn of the helix; a semi-circle of resilient material to removably encircle the irrigation pipe; and a mechanical connection between the semi-circle and the other end of the helix disposing the helix axis radially to the semi-circle, said semi-circle adapted to hold the other end of said helix in place substantially against said irrigation pipe around a perforation in said irrigation pipe whereby the water from the pipe first flows through the helix and then through the flexible tube when the helix is disposed over a perforation in the pipe.

2. A furrow irrigation hose as set forth in claim 1 wherein the helix comprises two turns and the tube is secured to the turn farthest removed from the semi-circle.

3. A furrow irrigation hose as set forth in claim 1 wherein the semi-circle and helix are formed of metal and the flexible tube is formed of sheet material.

4. A furrow irrigation hose as set forth in claim 1 wherein the semi-circle has a portion located intermediate its ends that is of greater diameter, to project outwardly of the irrigation pipe to be manually grasped as a handle.

References Cited in the file of this patent

UNITED STATES PATENTS

| | | |
|---|---|---|
| 425,367 | Caldwell | Apr. 8, 1890 |
| 635,121 | Bostrom | Oct. 17, 1899 |
| 863,571 | Kintner | Aug. 13, 1907 |
| 874,378 | Allen | Dec. 24, 1907 |
| 1,186,741 | Brower | June 13, 1916 |
| 1,279,785 | Styles | Sept. 24, 1918 |
| 1,753,501 | Christensen | Apr. 8, 1930 |
| 1,861,532 | Hough | June 7, 1932 |
| 2,143,440 | Hitchcock | Jan. 10, 1939 |
| 2,193,778 | Rabatin | Mar. 12, 1940 |
| 2,318,735 | Bickford | May 11, 1943 |
| 2,378,174 | Beede | June 12, 1945 |
| 2,725,892 | Gallistel | Dec. 6, 1955 |
| 2,807,478 | Hermann et al. | Sept. 24, 1957 |
| 2,861,527 | Phillips | Nov. 25, 1958 |

FOREIGN PATENTS

| | | |
|---|---|---|
| 20,720 | Great Britain | Oct. 30, 1894 |